(12) United States Patent
Zirin et al.

(10) Patent No.: US 8,171,633 B2
(45) Date of Patent: May 8, 2012

(54) METHOD FOR ASSEMBLING A MULTI-SEGMENT WIND TURBINE BLADE

(75) Inventors: Robert Michael Zirin, Niskayuna, NY (US); Wendy Wen-Ling Lin, Niskayuna, NY (US); Youdong Zhou, Niskayuna, NY (US); Shu Ching Quek, Clifton Park, NY (US); Grama Praveen, Lynwood, WA (US); Bowden Kirkpatrick, Bennington, VT (US); Jamie Thomas Livingston, Simpsonville, SC (US); Peggy Lynne Baehmann, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 1174 days.

(21) Appl. No.: 11/959,506

(22) Filed: Dec. 19, 2007

(65) Prior Publication Data

US 2009/0162206 A1 Jun. 25, 2009

(51) Int. Cl.
*B21D 53/28* (2006.01)

(52) U.S. Cl. ............... 29/889.61; 29/889.6; 416/241 R; 416/223 R; 416/225; 416/232; 416/233; 416/226

(58) Field of Classification Search ............... 29/889, 29/889.71, 889.7, 889.6, 889.61; 416/241 R, 416/223 R, 225, 232, 233, 226
See application file for complete search history.

(56) References Cited

U.S. PATENT DOCUMENTS

| | | | |
|---|---|---|---|
| 4,236,873 A | 12/1980 | Sherman et al. | |
| 4,474,536 A | 10/1984 | Gougeon et al. | |
| 4,944,655 A * | 7/1990 | Merz | 416/61 |
| 7,481,624 B2 * | 1/2009 | Wobben | 416/132 B |
| 2005/0214122 A1 | 9/2005 | Sorensen et al. | |
| 2006/0067827 A1 | 3/2006 | Moroz | |
| 2006/0188378 A1 | 8/2006 | Bech et al. | |
| 2006/0225278 A1 | 10/2006 | Lin et al. | |
| 2007/0036659 A1 | 2/2007 | Hibbard | |
| 2008/0069699 A1 * | 3/2008 | Bech | 416/229 R |

FOREIGN PATENT DOCUMENTS

| | | |
|---|---|---|
| EP | 1011182 A1 | 6/2000 |
| WO | 2004/015265 A1 | 2/2004 |
| WO | 2004/076852 A2 | 9/2004 |
| WO | 2005/005825 A1 | 1/2005 |
| WO | 2006/002621 A1 | 1/2006 |
| WO | 2007/048408 A1 | 5/2007 |

OTHER PUBLICATIONS

Herbert J. Sutherland; "On the fatigue analysis of wind turbines" [SAND99 0089] Unlimited Release Printed 1999; Sandia National Laboratories; Albuquerque, NM. (54Pages).

(Continued)

*Primary Examiner* — Richard Chang
(74) *Attorney, Agent, or Firm* — Ann M. Agosti (57) ABSTRACT

A multi segment wind turbine blade comprises at least two blade segments. A first blade segment comprises an outer skin, a bulkhead, and first alignment brackets removably coupled to the outer skin of the first blade segment. A first portion of a flange of the bulkhead is bonded to the first blade segment and a second portion of the flange of the bulkhead projects out from the first blade segment. A second blade segment comprises an outer skin and second alignment brackets removably coupled to the outer skin of the first blade segment. The first and second alignment brackets are alignable upon the outer side of the second blade segment being inserted over the second portion of the flange of the bulkhead.

6 Claims, 10 Drawing Sheets

OTHER PUBLICATIONS

Herbert J. Sutherland; "On the fatigue analysis of wind turbines" [SAND99 0089] Unlimited Release Printed 1999; Sandia National Laboratories; Albuquerque, NM. (40Pages).

Herbert J. Sutherland; "On the fatigue analysis of wind turbines" [SAND99 0089] Unlimited Release Printed 1999; Sandia National Laboratories; Albuquerque, NM. (13Pages).

* cited by examiner

METHOD FOR ASSEMBLING A MULTI-SEGMENT WIND TURBINE BLADE

CROSS REFERENCE TO RELATED APPLICATION

This application is related to commonly assigned U.S. patent application Ser. No. 11/959,503, filed currently herewith, which is herein incorporated by reference.

BACKGROUND

The subject matter disclosed herein relates generally to wind turbine blades, and more particularly, to a multi-segment wind turbine blade with at least two blade segments and a method of assembling the at least two blade segments.

Transporting lengthy wind turbine blades to a field site incurs significant costs. As the capacity of wind turbines increases, the lengths of the wind turbine blades also increase, further adding to difficulties and costs of transportation. Therefore, there is a need for a wind turbine blade comprising multiple blade segments and a method of assembling the blade segments. The blade segments can be transported to the field site at lower costs and assembled to form the wind turbine blade.

BRIEF DESCRIPTION

In accordance with one embodiment disclosed herein, a method comprises bonding a first portion of a flange of a bulkhead to a first blade segment such that a second portion of the flange of the bulkhead projects out from the first blade segment, bonding first alignment brackets to an outer skin of the first blade segment with removable adhesive, situating an outer skin of a second blade segment over the second portion of the flange of the bulkhead segment, fastening second alignment brackets to the first alignment brackets, bonding the second alignment brackets to the outer skin of the second blade segment with removable adhesive, unfastening the first and second alignment brackets, and removing the second blade segment from the bulkhead.

In accordance with another embodiment disclosed herein, a kit for assembly of a wind turbine blade comprises a first blade segment comprising an outer skin, a bulkhead, and first alignment brackets removably coupled to the outer skin of the first blade segment, wherein a first portion of a flange of the bulkhead is bonded to the first blade segment and a second portion of the flange of the bulkhead projects out from the first blade segment; a second blade segment comprising an outer skin and second alignment brackets removably coupled to the outer skin of the first blade segment, wherein the first and second alignment brackets are alignable upon the outer side of the second blade segment being inserted over the second portion of the flange of the bulkhead.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
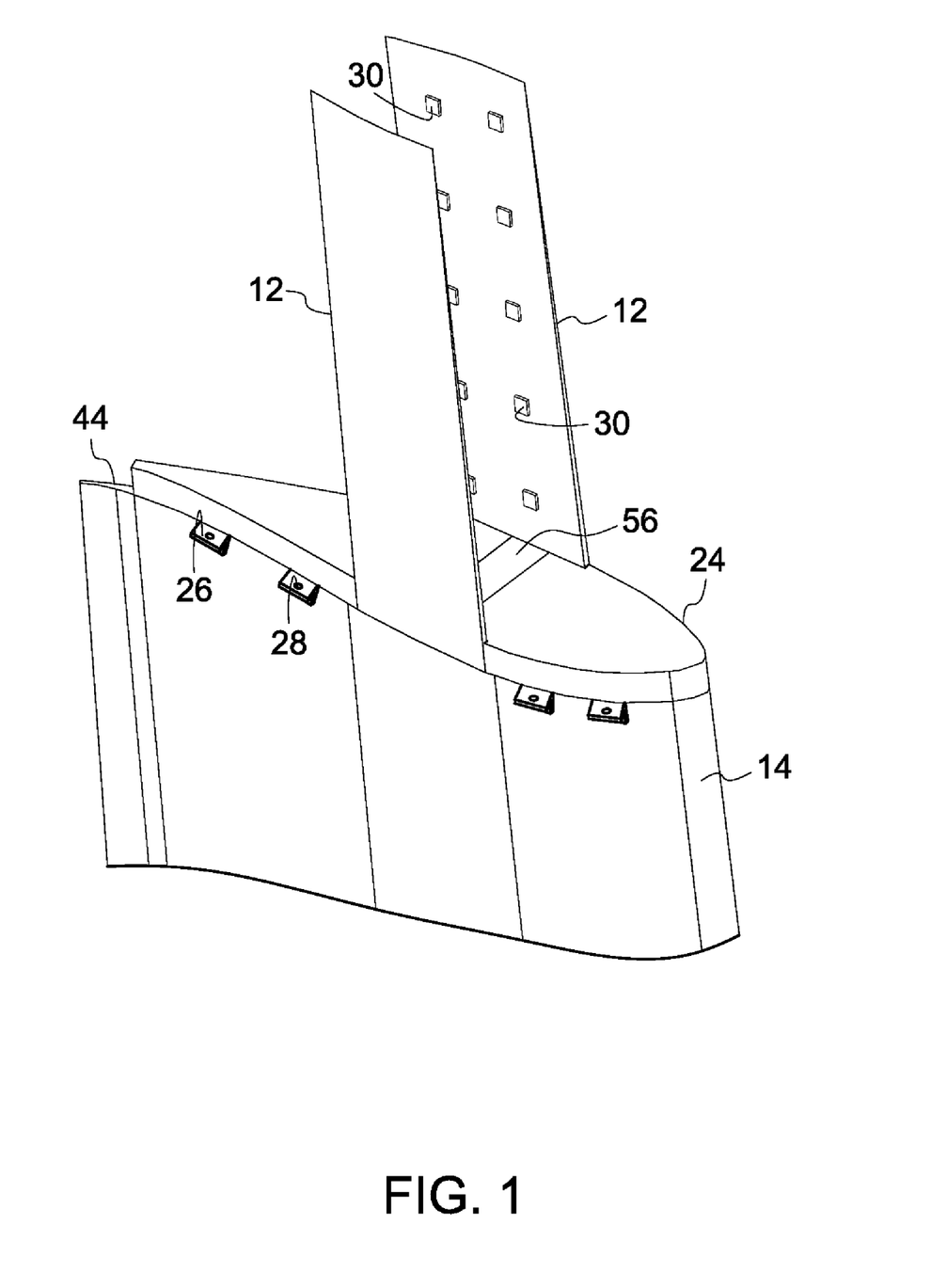
FIG. 1 illustrates a first blade segment with a first spar cap segment and a bulkhead in accordance with aspects disclosed herein.
Figure 9:
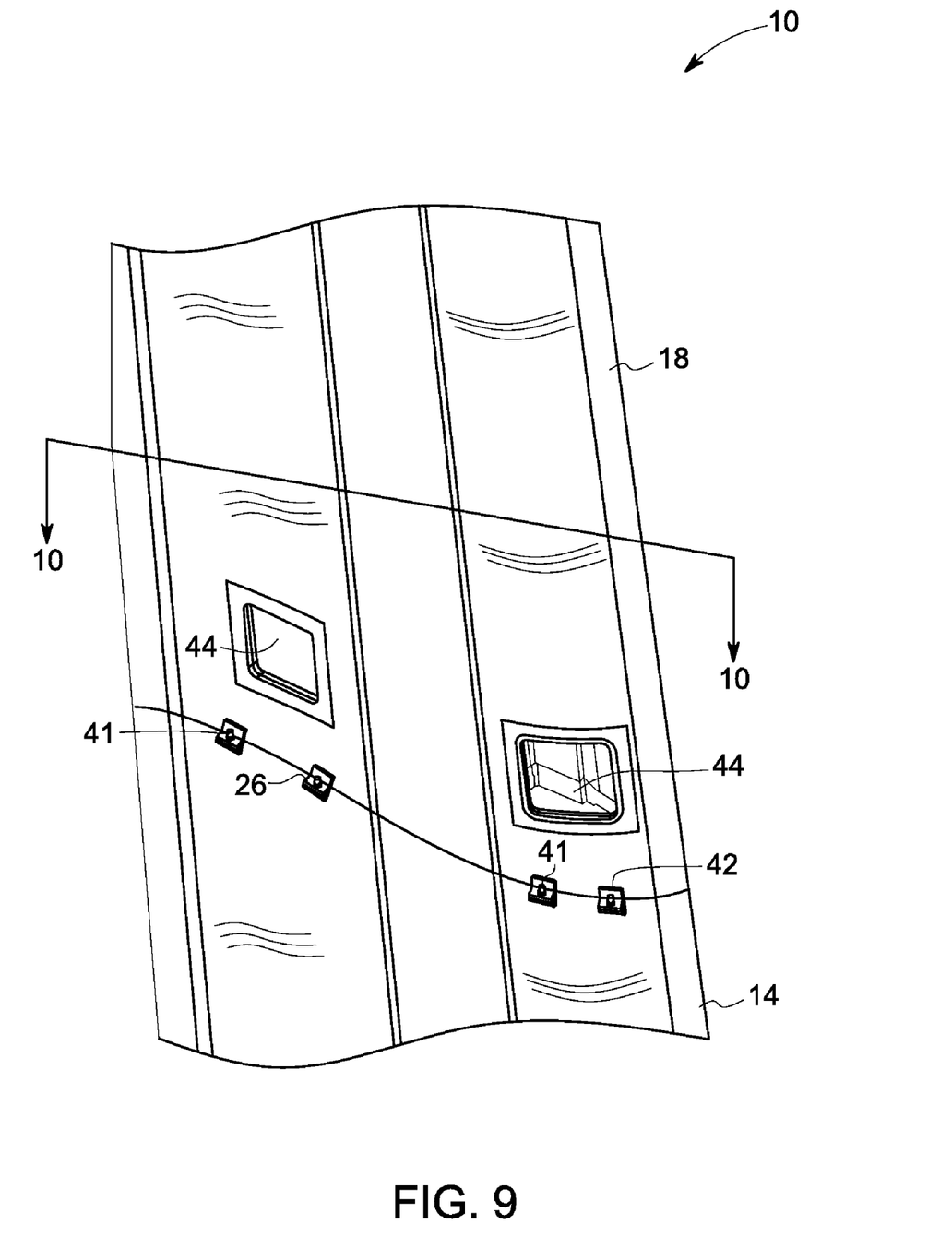
FIG. 9 illustrates the first blade segment and a second blade segment situated over the first blade segment in accordance with aspects disclosed herein.
Figure 10:
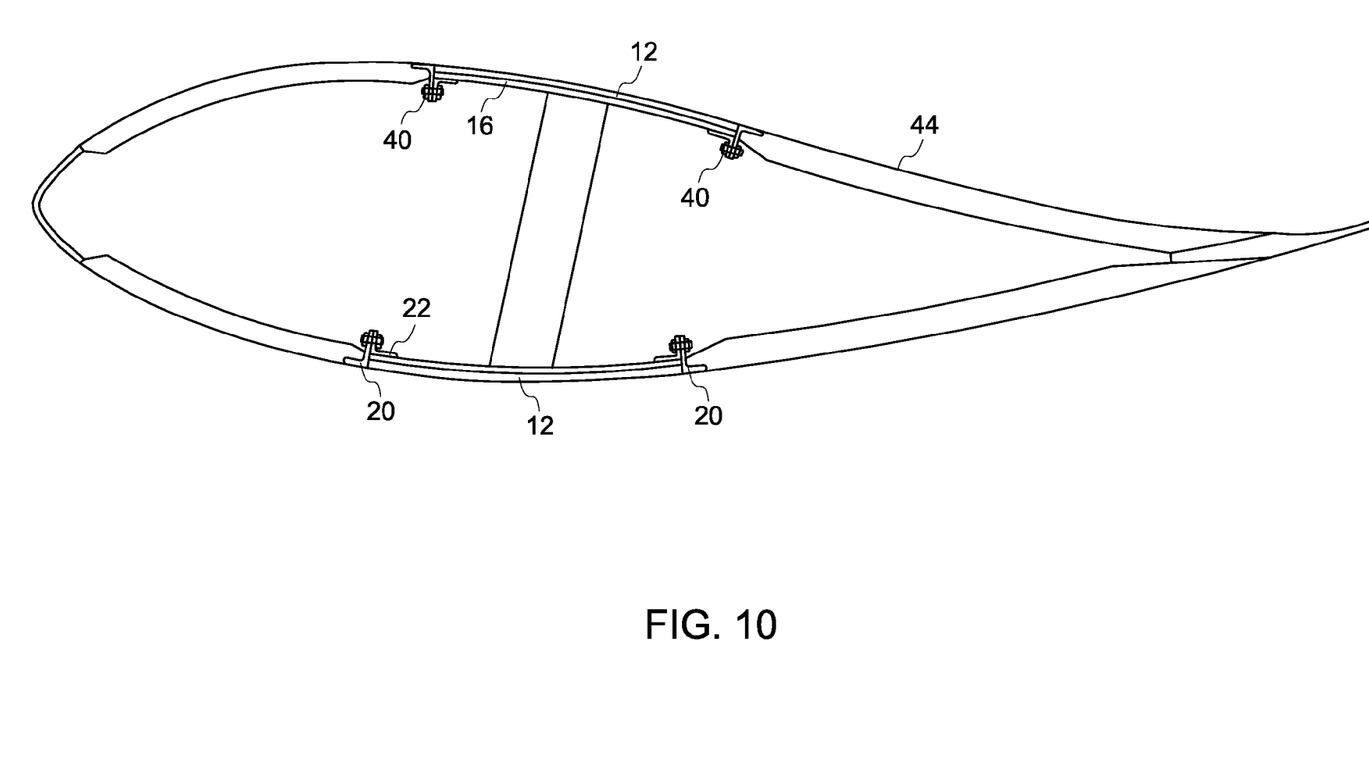
FIG. 10 illustrates a sectional view taken along line 10-10 in FIG. 9 with the first and the second alignment brackets removed in accordance with aspects disclosed herein.

Embodiments disclosed herein include multi-segment wind turbine blades and methods to align and assemble wind turbine blade segments. Alignment methods are performed at a first site prior to transport in order to facilitate assembly of blades at a second site or field site. As used herein, singular forms such as "a," "an," and "the" include plural referents unless the context clearly dictates otherwise In one embodiment, as shown in FIGS. 1, 9 and 10, a wind turbine blade 10 comprises a first spar cap segment 12 attached to a first blade segment 14 and a second spar cap segment 16 attached to a second blade segment 18. The first and second spar cap segments are configured to form a scarf joint, as will be explained below in detail. First spar cap brackets 20 are attached to the first spar cap segment 12 and second spar cap brackets 22 are attached to the second spar cap segment 16. The first and second spar cap brackets are attached in locations of the first and second spar cap segments respectively selected to facilitate alignment of the first and second spar cap segments at the scarf joint. Fasteners 40 are configured for coupling respective pairs of first and second spar cap brackets.

The first and second blade segments are hollow segments comprising outer skin 44. The skin is made from materials that is light-weight and strong. The spar cap segments bear longitudinal-loads experienced by the wind turbine blades and are attached to the inside of the skin of the blade segments. The wind turbine blade 10 also comprises a bulkhead 24 at the intersection of the first and second blade segments. The bulkhead 24 further increases the structural strength of the wind turbine blade.

FIG. 1 illustrates an exemplary first blade segment 14 wherein first spar cap segments 12 comprise outer spar cap segments. In other words, portions of the second spar cap segments will be inserted between the first spar cap segments 12. Spar cap segments typically comprise a material such as fiberglass or carbon composites that are strong and capable of withstanding longitudinal loads.

FIG. 1 additionally illustrates shims 30 which are optionally positioned on either the first or second spar cap segments to further facilitate the alignment. In one embodiment, the shims are bonded to the inside facing surfaces of the first spar cap segments 14. The shims 30 typically comprise materials such as fiberglass or plastic, and in one example have a minimum thickness in the range of 1 mm to 3 mm. The purpose of the shims 14 will be discussed in detail below.

FIG. 1 additionally illustrates first alignment brackets 26 for use in another embodiment relating to skin alignment that is described in further detail below. The first alignment brackets 26 are bonded to the outer skin of the first blade segment 14 with removable adhesive. The first alignment brackets 26 are L-shaped members in one embodiment. One side of the L-shaped first alignment brackets is bonded to an end portion of the outer skin of the first blade segment 14 such that the other side projects away from the first blade segment. The side that projects away from the first blade segment 14 may include holes 28 to accommodate fasteners.

Figure 2:
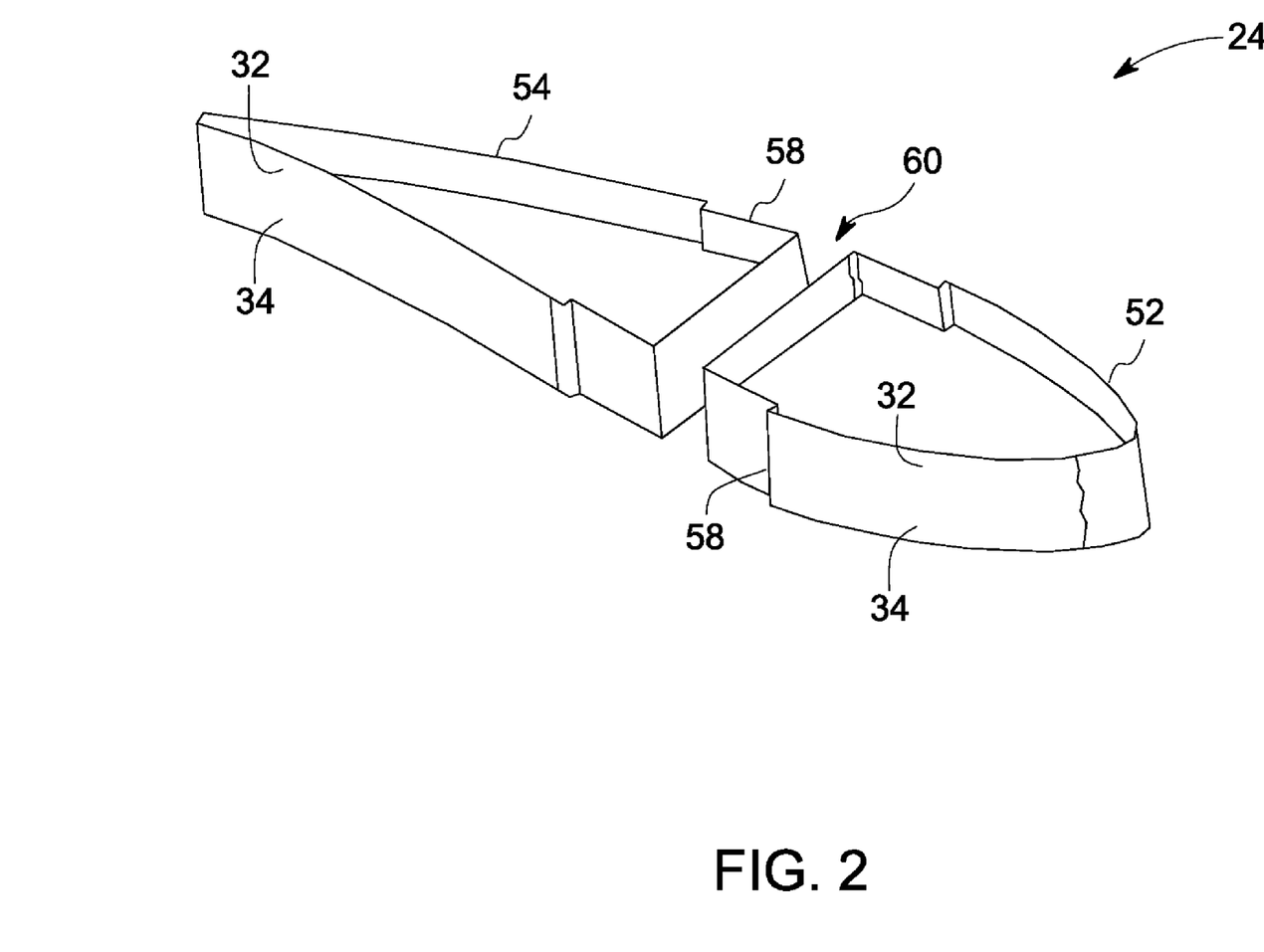
FIG. 2 illustrates a bulkhead in accordance with aspects disclosed herein.

Referring to FIGS. 1 and 2, the bulkhead 24 is at the connection between outer skins of the first and second blade segments. A flange of the bulkhead is referenced as having a first portion 32 and a second portion 34 for explanatory purposes. The first portion 32 of the flange of the bulkhead is bonded to the inside surface of the outer skin of the first blade segment 14 such that the second portion 34 of the flange of the bulkhead projects out from the first blade segment. The bulkhead 24 comprises a leading edge bulkhead 52 and a trailing edge bulkhead 54 separated by a gap 60 to accommodate a shear web 56 for connecting the first spar cap segments 12. The center portion of the bulkhead is represented by the sides of the leading edge bulkhead 52 and the trailing edge bulkhead 54 that face each other and is configured to accommodate the first spar cap segment 12 by including recesses 58 dimensioned to receive the first spar cap segments 12. The bulkhead typically comprises materials such as fiberglass or carbon composite. The thickness of the bulkhead is typically 5-10 mm.

Figure 3:
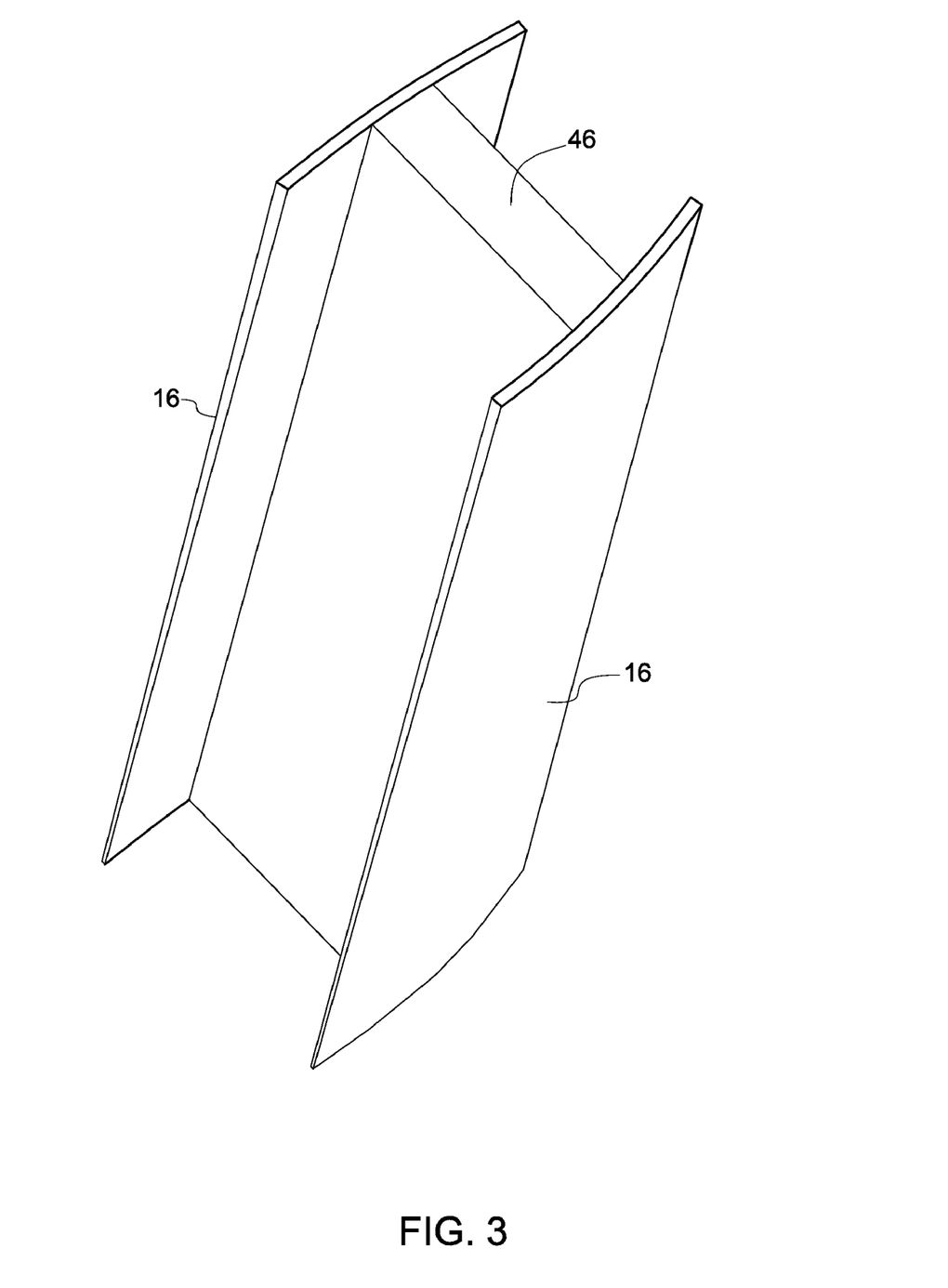
FIG. 3 illustrates a second spar cap segment in accordance with aspects disclosed herein.
Figure 4:
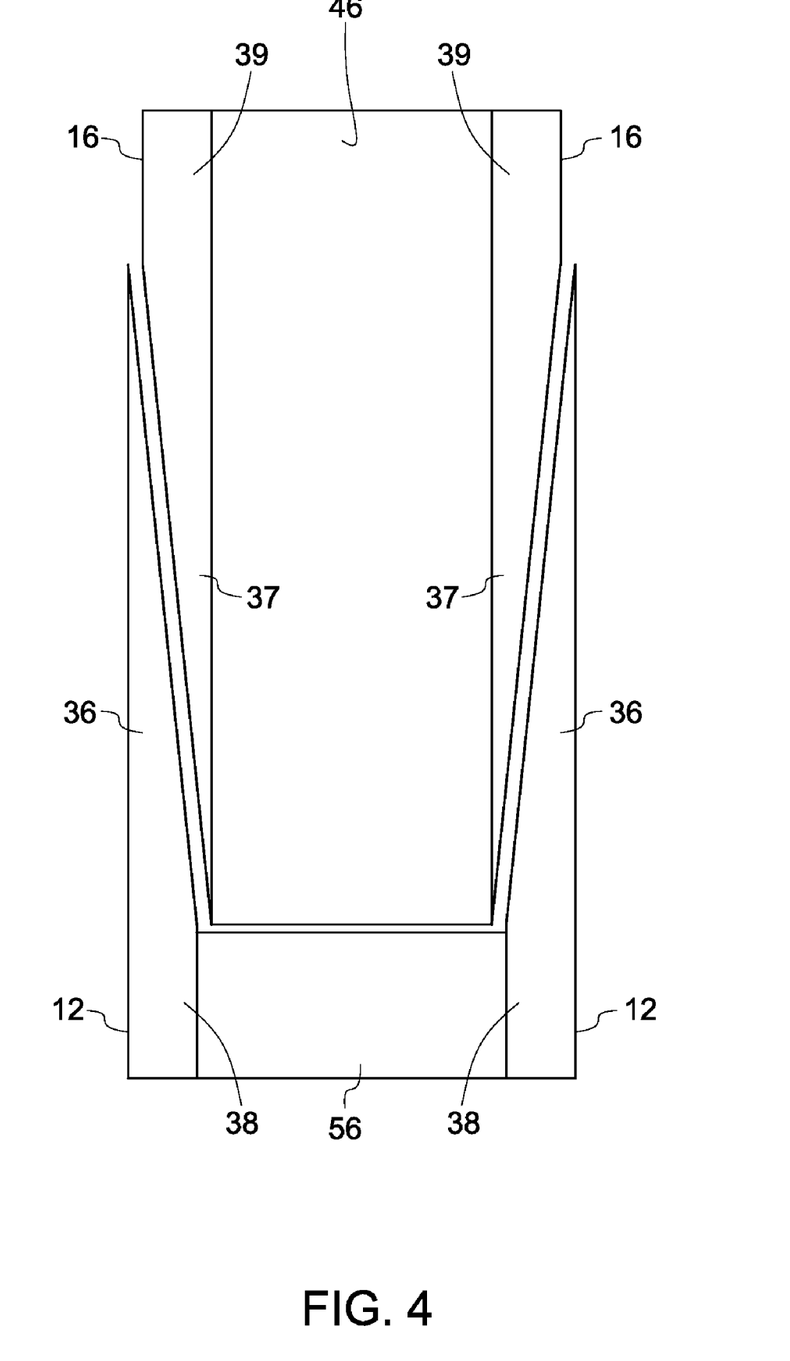
FIG. 4 illustrates a scarf joint formed by aligning the tapered sections of the first and second spar cap segments in accordance with aspects disclosed herein.

As shown in the embodiment of FIGS. 1, 3 and 4, the first spar cap segment 12 includes tapered 36 and non-tapered 38 sections, and a distance between the two tapered sections remains substantially constant along the length of the tapered sections. As used herein, substantially constant means plus or minus 25 percent of the average gap. The shear web 56 of the first spar cap segments 12 connects the non-tapered sections 38 of the first spar cap segments 12. The second spar cap segment 16 also includes tapered 37 and non-tapered 39 sections. The alignment occurs over the tapered sections 36 and 37 of the first and second spar cap segments. A shear web 46 connects the second spar cap segments 16. Specifically, the outer sides of the tapered sections 36 of the first spar cap segments 12 are straight while the inner sides are tapered till the end. The inner sides of the tapered sections 37 of the second spar cap segments 16 are straight while the outer sides are tapered till the end. To form the alignment, the tapered inner sides of the first spar cap segments are positioned over the tapered outer sides of the second spar cap segments. This forms a scarf joint. In a further example, the length of the tapered section is 20 to 80 times greater than the thickness of the non-tapered section for both the first and the second spar cap segments.

Figure 5:
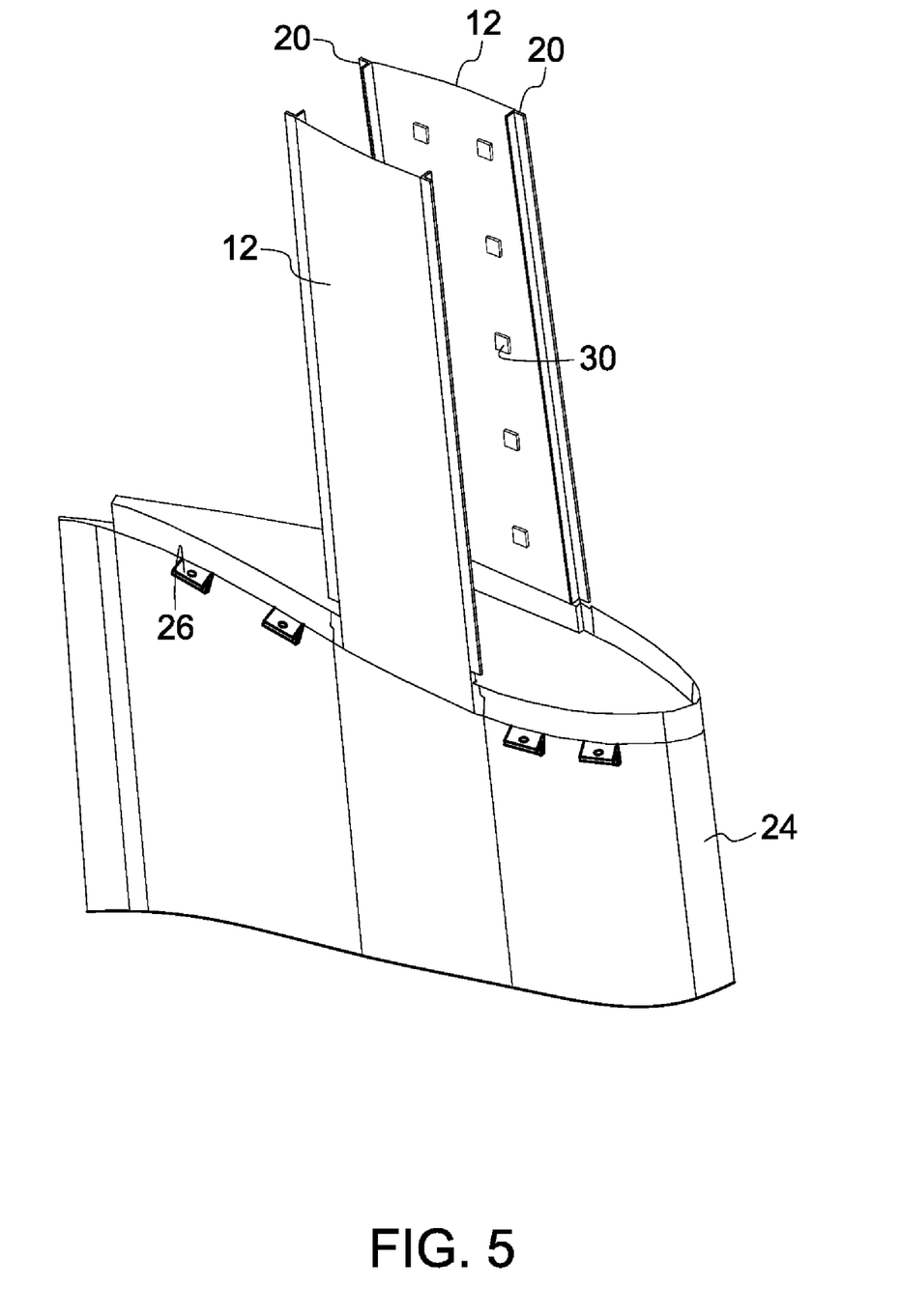
FIG. 5 illustrates the first blade segment with first spar cap brackets bonded to the first spar cap segment in accordance with aspects disclosed herein.

FIG. 5 illustrates first spar cap brackets 20 bonded to the sides of the tapered sections 36 of the first spar cap segments 12. The first spar cap brackets 20 may comprise L-shaped bars, as can be more clearly seen in FIG. 6. In one embodiment, the length of the brackets 20 is equal to the length of the tapered sections 36. One side of the L-shaped first spar cap bracket is bonded to an edge of the tapered section of one of the first spar cap segments such that the bonded side projects towards the opposite first spar cap segment. Four such first spar cap brackets are used. The bonded sides of the first spar cap brackets include holes 48 to accommodate fasteners.

Figure 6:
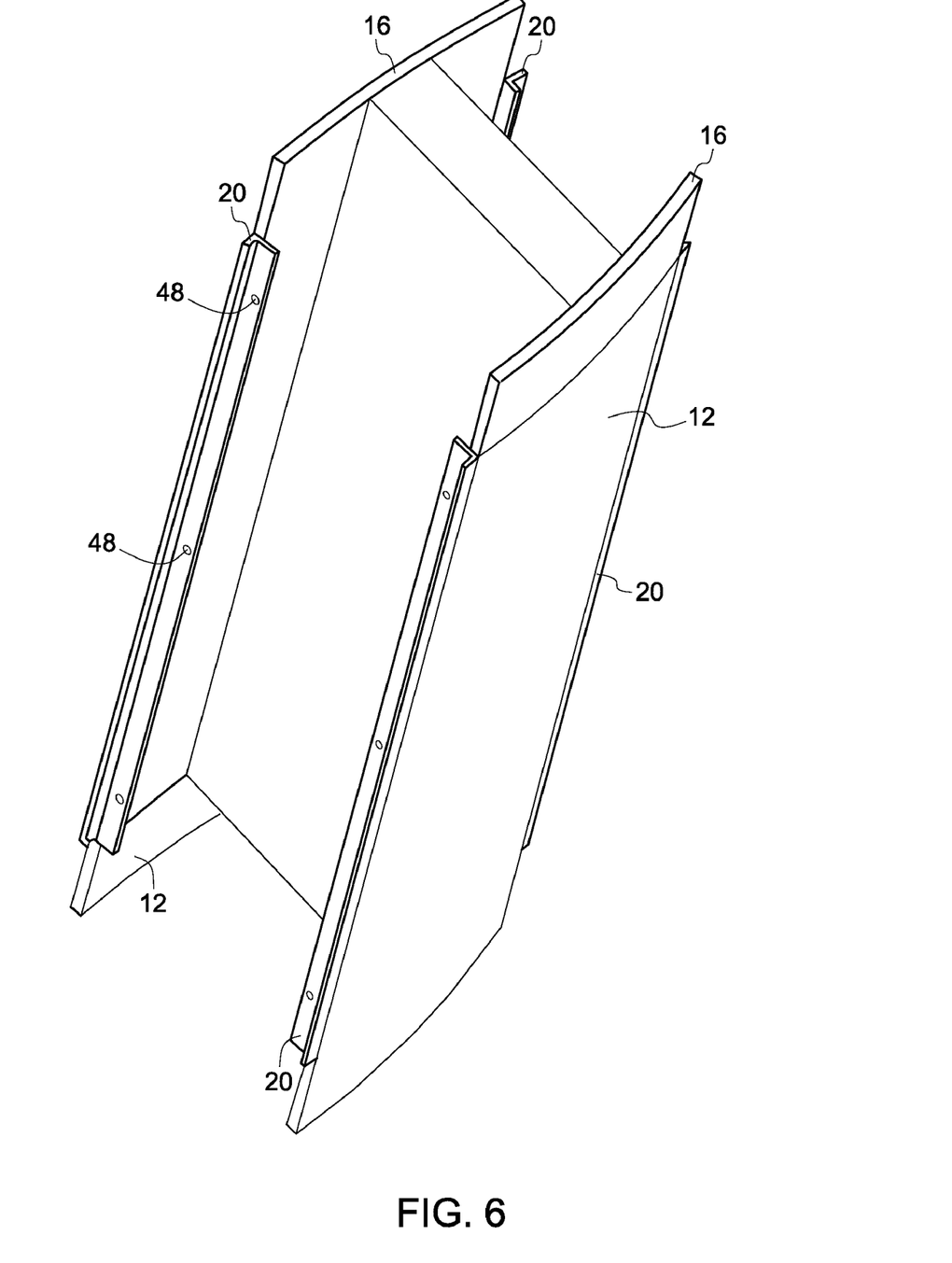
FIG. 6 illustrates the first and second spar cap segments aligned to form a scarf joint in accordance with aspects disclosed herein.
Figure 7:
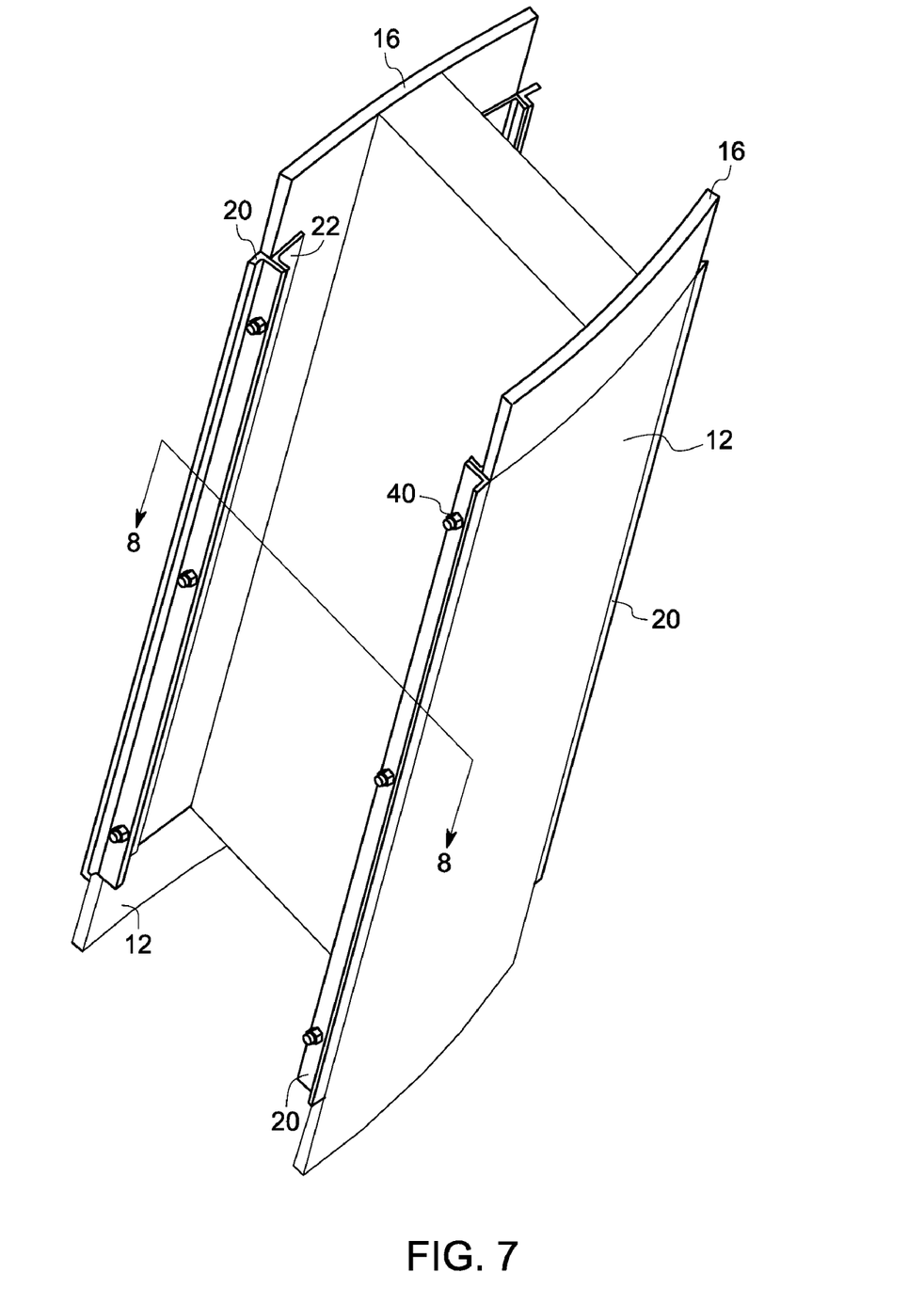
FIG. 7 illustrates the first and second spar cap segments, with second spar cap brackets bonded to the second spar cap segment in accordance with aspects disclosed herein.
Figure 8:
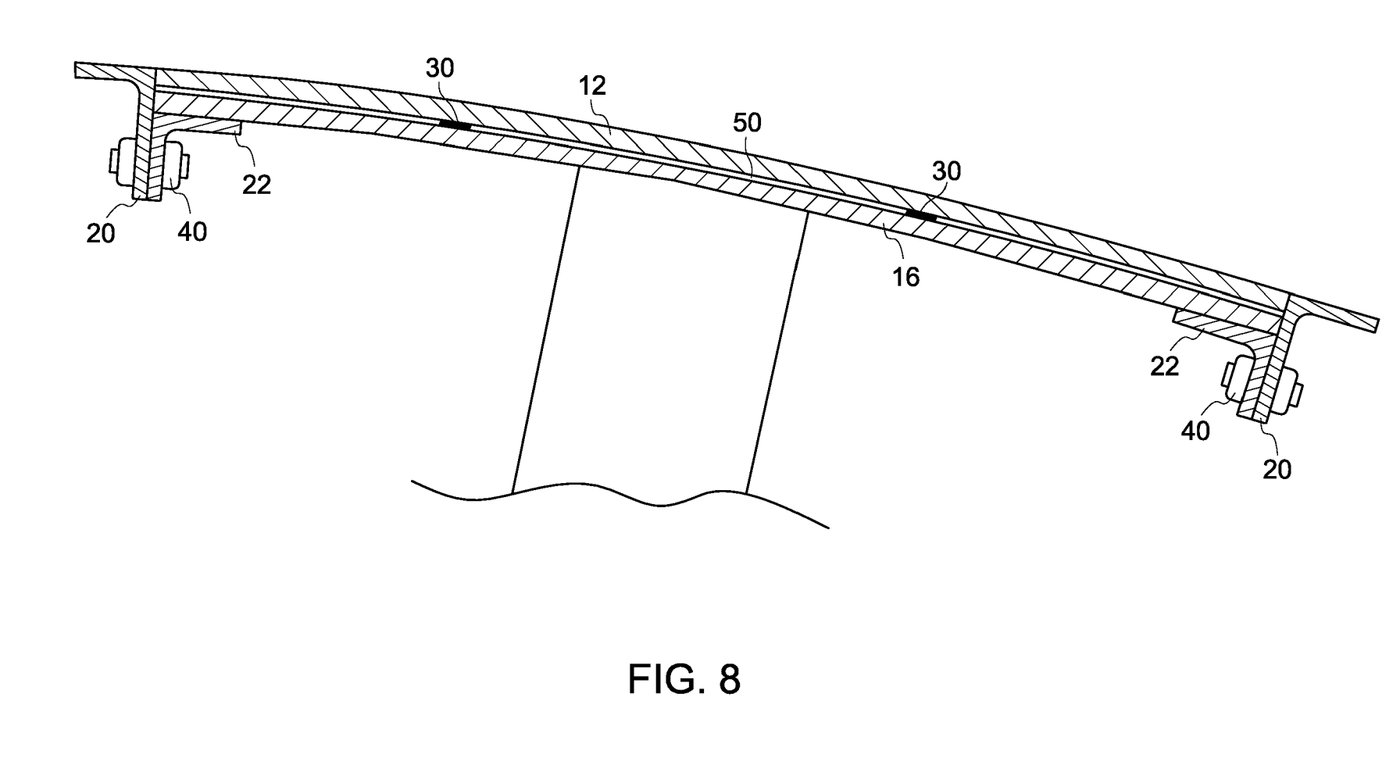
FIG. 8 illustrates a partial sectional view taken along line 8-8 in FIG. 7.

Referring to FIGS. 6, 7 and 8, the tapered sections 37 of the second spar cap segment 16 are inserted between the tapered sections 36 of the first spar cap segments 12 to form the scarf joint. The shims 30 are not required but do assist in maintaining a minimum thickness of gap 50 between the tapered sections of the first and second spar cap segments. The thickness of the shims 30 less than or equal to the gap 50. The second spar cap brackets 22 are aligned with and attached to the first spar cap brackets 20 using fasteners 40 such as bolts. The second spar cap brackets 22 may be of same construction as the first spar cap brackets 20, having L-shape and holes. Preferably, the length of the second spar cap brackets is equal to the length of the tapered sections of the second spar cap segment. One side of the L-shaped second spar cap brackets with holes is aligned and fastened to the side of the first spar cap brackets with holes. The other side of the second spar cap brackets 22 is then bonded to the inside-facing surface of the second spar cap segment 16. In one embodiment, adhesive is applied to the side of the second spar cap brackets 22 that is to be bonded to the inside facing surface of the second spar cap segment 16. The other side of the second spar cap brackets 22 (the side with holes) is then fastened to the side of the first spar cap brackets with holes. The second spar cap brackets 22 are held in place with fasteners until the adhesive is cured. Although long brackets are illustrated for purposes of example, if desired, other types of brackets, sizes of brackets, or numbers of brackets may be used.

After bonding takes place, the second spar cap brackets 22 are unfastened from the first spar cap brackets 20. The shims 30 on the first spar cap segment 12 can be left in place or removed.

Referring to FIGS. 1 and 9, in one embodiment the outer skin of the second blade segment 18 is situated over the second portion 34 of the flange of the bulkhead 24 that projects out from the first blade segment 14. Second alignment brackets 42 are then fastened to the first alignment brackets 26 with fasteners 41 such as bolts. The second alignment brackets 42 may be of same construction as the first alignment brackets 26. One side of the L-shaped second alignment brackets that includes holes is fastened to the side of the first alignment brackets that has holes. The other side of the second alignment brackets 42 is then bonded to the outer skin of the second blade segment 18 with removable adhesive. After bonding takes place, the first and second alignment brackets are unfastened. The second blade segment 18 along with the second alignment brackets 42 is removed from the bulkhead. Preferably, the removable adhesive comprises a thermoplastic adhesive, which loses its adhesive property when heated to a certain temperature or exposed to hot water. Some examples of the thermoplastic adhesives are Aquabond™ thermoplastic adhesive, Crystalbond™ adhesives, or other thermoplastic films made from polycarbonate, acrylic, polymethylmethacrylate, polyethylene, polyvinylchoride, polyester, or blends or copolymers make from these polymers. The second spar cap segment 16 with the bonded second spar cap brackets 22 is then attached to the inside of the outer skin of the second blade segment.

The above process completes the alignment preparations before transporting the first and second blade segments. The first blade segment with attached bulkhead, first spar cap segments and first spar cap brackets, and the second blade segment with attached second spar cap segment and second spar cap brackets are then transported to a field site. In one embodiment, the first blade segment is configured for being situated closer to a wind turbine rotor hub (not shown) than the second blade segment. The above embodiments are merely for illustrative purposes. For example, the bulkhead could alternatively be initially attached to the second blade segment if desired and the second blade segment may be configured closer to the wind turbine rotor hub in other embodiments.

Referring to FIGS. 9 and 10, at the field site, the outer skin of the second blade segment 36 is situated over the second portion of the flange of the bulkhead. In the process of situating the outer skin of the second blade segment 36 over the second portion of the flange of the bulkhead, the tapered section of the second spar cap segment is inserted between the tapered sections of the first spar cap segments. The first and second spar cap brackets act as guides during this process. The holes on the first and second spar cap brackets and the first and second alignment brackets are also aligned. The first and second spar cap brackets are then fastened with bolts. Access holes 44 are provided on the outer skin of the second blade segment 36 to enable fastening the first and second spar cap brackets.

A low-viscosity adhesive is injected between the tapered sections of the first and second spar cap segments through the access holes 44. Alternatively, a paste adhesive can be applied to the tapered sections of the first and second spar cap segments before situating the outer skin of the second blade segment 36 over the first blade segment 10. In case of the low-viscosity adhesive, the shims are configured to be permeable so as to absorb the low-viscosity adhesive. The adhesives may comprise materials such as epoxies, methylmethacrylates, vinylesters, or polyesters.

The first and second alignment brackets 26 and 42 may also be fastened with bolts. The second portion 24 of the flange of the bulkhead 14 is bonded to the outer skin of the second blade segment 36 by injecting glue through the access holes 44. In a preferred embodiment, a low-viscosity adhesive is injected simultaneously between the first and second spar cap segments and on the second portion of the flange of the bulkhead. Alternatively, a paste adhesive can be applied to the second portion 24 of the flange of the bulkhead 14 before situating the outer skin of the second blade segment 36 over the first blade segment 10.

After bonding takes place, the first and second alignment brackets are removed by applying heat to the thermoplastic adhesive used to bond the first and second alignment brackets to the outer skins of the first and second blade segments. This completes the assembly of the first and blade segments. Panels are used to cover the access holes after the first spar cap segment bonds to the second spar cap segment and the second portion of the flange of the bulkhead bonds to the second blade segment. The combination of these two alignment techniques for the spar caps and outer skin is beneficial, but either these techniques may also be used separately if desired.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for assembling a wind turbine blade, comprising:
bonding a first portion of a flange of a bulkhead to a first blade segment such that a second portion of the flange of the bulkhead projects out from the first blade segment;
bonding first alignment brackets to an outer skin of the first blade segment;
situating an outer skin of a second blade segment over the second portion of the flange of the bulkhead;
fastening second alignment brackets to the first alignment brackets;
bonding the second alignment brackets to the outer skin of the second blade segment;
unfastening the first alignment brackets from the second alignment brackets; and
removing the second blade segment from the bulkhead.

2. The method of claim 1, wherein the second alignment brackets are fastened to the first alignment brackets using bolts.

3. The method of claim 1,
wherein the outer skin of the second blade segment is situated over the second portion of the flange of the bulkhead at a field site.

4. The method of claim 1, wherein the first alignment brackets are bonded to the outer skin of the first blade segment and the second alignment brackets are bonded to the outer skin of the second blade segment using removable adhesive.

5. The method of claim 4, wherein the removable adhesive comprises a thermoplastic adhesive.

6. The method of claim 5, further comprising the step of applying heat to remove the thermoplastic adhesive.

* * * * *

UNITED STATES PATENT AND TRADEMARK OFFICE
CERTIFICATE OF CORRECTION

PATENT NO. : 8,171,633 B2  
APPLICATION NO. : 11/959506  
DATED : May 8, 2012  
INVENTOR(S) : Zirin et al.

Page 1 of 1

It is certified that error appears in the above-identified patent and that said Letters Patent is hereby corrected as shown below:

On the Cover Page, item (75), under "Inventors", in Column 1, Line 9, delete "Lynne" and insert -- Lynn --, therefor.

In Column 2, Line 67, delete "14." and insert -- 12. --, therefor.

In Column 3, Line 3, delete "14" and insert -- 30 --, therefor.

In Column 4, Line 53, delete "polyvinylchoride," and insert -- polyvinylchloride, --, therefor.

In Column 5, Line 31, delete "14" and insert -- 24 --, therefor.

In Column 5, Line 39, delete "10." and insert -- 14. --, therefor.

Signed and Sealed this  
Thirty-first Day of July, 2012

David J. Kappos  
*Director of the United States Patent and Trademark Office*